(12) United States Patent
Bersegol et al.

(10) Patent No.: US 7,235,802 B2
(45) Date of Patent: Jun. 26, 2007

(54) PACKAGING FOR THE TRANSPORT/STORAGE OF RADIOACTIVE MATERIAL

(75) Inventors: Jean-Pierre Bersegol, Luzarches (FR); Benoît Alaurent, Bagnols Surceze (FR); René Chiocca, Paris (FR)

(73) Assignee: Cogema Logistics, Montigny le Bretonneux (FR)

( * ) Notice: Subject to any disclaimer, the term of this patent is extended or adjusted under 35 U.S.C. 154(b) by 197 days.

(21) Appl. No.: 10/540,043

(22) PCT Filed: Dec. 22, 2003

(86) PCT No.: PCT/FR03/50199

§ 371 (c)(1),
(2), (4) Date: Jun. 22, 2005

(87) PCT Pub. No.: WO2004/059660

PCT Pub. Date: Jul. 15, 2004

(65) Prior Publication Data

US 2006/0249517 A1    Nov. 9, 2006

(30) Foreign Application Priority Data

Dec. 24, 2002    (FR) .................................. 02 16649

(51) Int. Cl.
*G21F 5/02*        (2006.01)
(52) U.S. Cl. .................................. 250/506.1
(58) Field of Classification Search ............. 250/506.1, 250/507.1
See application file for complete search history.

(56) References Cited

U.S. PATENT DOCUMENTS

| 3,930,432 A | | 1/1976 | Puchy |
| 5,064,575 A | * | 11/1991 | Madle et al. ................. 588/16 |
| 2002/0153498 A1 | | 10/2002 | Dougherty et al. |

FOREIGN PATENT DOCUMENTS

| DE | 2 336 942 | 7/1973 |
| EP | 2001264486 | 9/2001 |
| FR | 1494181 | 9/1967 |
| FR | 2649824 | 1/1991 |
| FR | 2691765 | 12/1993 |
| GB | 1138790 | 1/1969 |

OTHER PUBLICATIONS

Rapport De Recherche Preliminaire, INPI, Nov. 17, 2003; 1 pg.

* cited by examiner

*Primary Examiner*—Kiet T. Nguyen
(74) *Attorney, Agent, or Firm*—Thelen Reid Brown Raysman and Steiner LLP (57) ABSTRACT

The invention relates to a container (1) intended for transport/storage of radioactive materials, the container comprising a container body (2) and at least one handling device (8) mounted using attachment screws (38) in a base housing (30) delimited by a base housing wall (32). According to the invention, a sealing plate (50) covering the attachment screws is installed removably in a plate housing (52) delimited by a plate housing wall (56) provided on the handling device and by a portion (58) of the base housing wall. Furthermore a seal (66) is provided inserted between a peripheral wall (60) external to the plate and the portion (58) of the base housing wall, and a seal (74) inserted between a peripheral wall (68) external to the plate and the plate housing wall (56).

17 Claims, 5 Drawing Sheets

PACKAGING FOR THE TRANSPORT/STORAGE OF RADIOACTIVE MATERIAL

CROSS-REFERENCE TO RELATED APPLICATION

This application claims priority based on International Patent Application No. PCT/FR2003/050199, entitled "Packaging for the Transport/Storage of Radioactive Material" by Jean-Pierre Bersegol, Benoît Alaurent and René Chiocca, which claims priority of French Application No. 02/16649, filed on Dec. 24, 2002, and which was not published in English.

TECHNICAL DOMAIN

This invention relates to a container intended for transport/storage of radioactive materials.

STATE OF PRIOR ART

Figure 1:
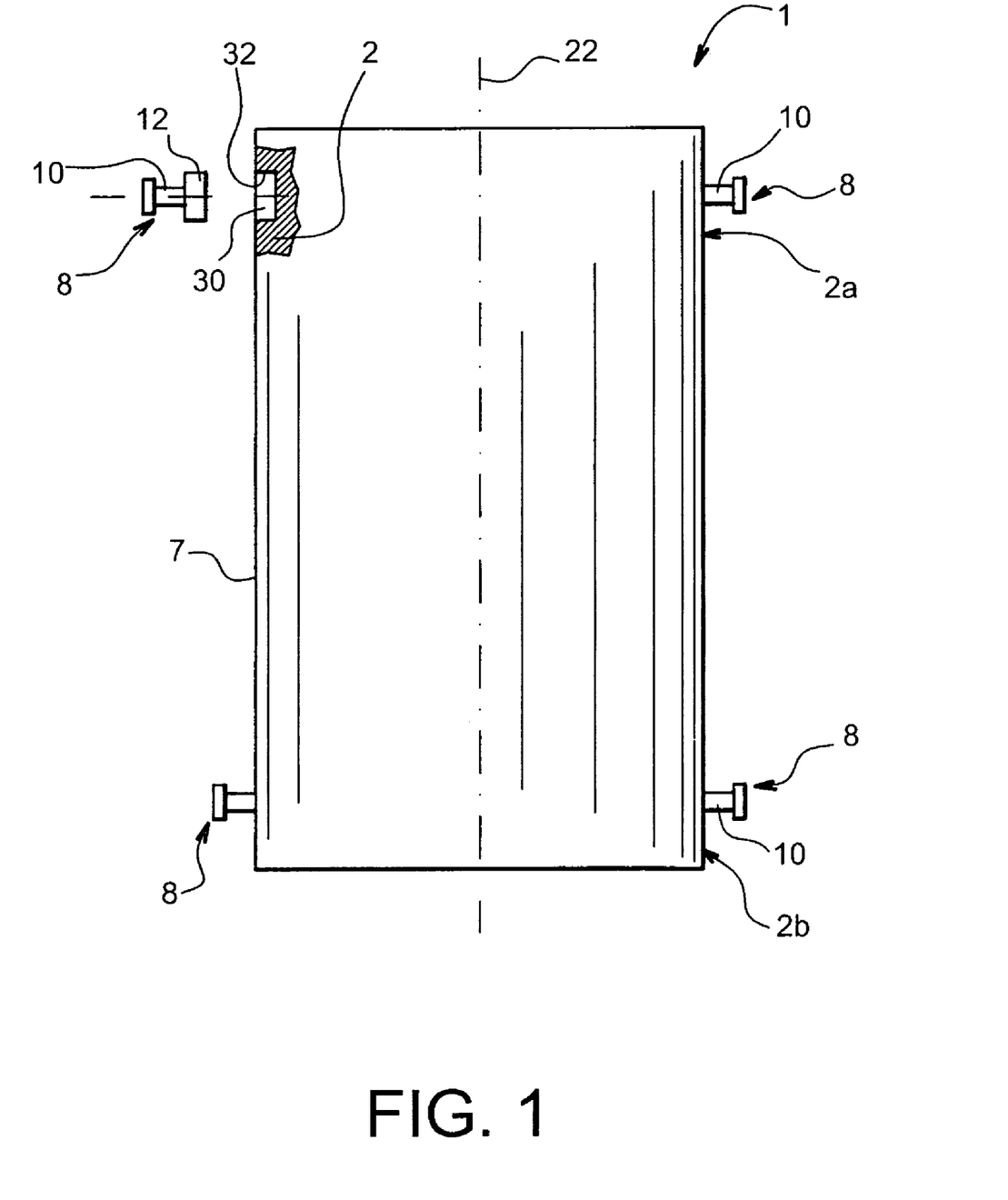
FIG. 1, already described, shows a container intended for the transport/storage of radioactive materials according to a conventional embodiment according to prior art.

As can be seen in FIG. 1 representing a conventional container 1 according to prior art, this container 1 is provided with a container body 2 with an internal wall (not shown) delimiting a cavity inside which radioactive materials may be placed.

Furthermore, the container 1 comprises a plurality of handling devices 8 also called <<handling trunnions>>.

As can be seen in FIG. 1, each handling device 8 is provided with a main part 10 projecting outwards from the container body 2. The main part 10 is designed so that it can cooperate with a gripping mechanism (not shown) so that various handling operations of the container can be carried out. Furthermore, each handling device 8 is also provided with a base 12 fixed to the main part 10, this base being located in a base housing 30, delimited by a base housing wall 32 formed on the container body 2 of the container 1.

Containers intended for transport/storage of radioactive materials may be loaded/unloaded under water in pools in nuclear installations during their life cycle.

Thus, during immersion periods, the container is in contact with contaminated water in the pool, and therefore its outside surfaces might be contaminated. This is why regulation requirements impose that container surfaces in contact with water should not have any retention areas so that they can easily be decontaminated, for example using a high pressure water jet.

Handling devices 8 are preferably arranged at an upper end portion 2a and a lower end portion 2b of the container body 2. Consequently, when the container is immersed in a loading/unloading pit, the handling devices 8 might also be contaminated.

In this way, apart from the need to perform decontamination operations for each handling device 8, it is also essential to provide sealing means (not shown in FIG. 1) preventing water infiltrations between the base 12 of the handling device 8 and the base housing wall 32 provided on the container body 2 of the container 1.

A first solution in prior art was to start by welding the handling device into its associated housing, thus providing a perfect seal of the assembly obtained. However, this first solution of an irreversible assembly was quickly abandoned because it was observed that repetitive handling operations could degrade these handling devices, such that it was sometimes necessary to replace them one or several times during the life cycle of the container.

Thus, one assembly solution for easy assembly/disassembly of handling devices was then proposed. This solution consists of using a plurality of attachment screws distributed around the main part and fixing the base of the handling device onto the container body. For information, note that this solution was preferred to another solution that was also considered consisting of screwing the base into its associated housing directly. The choice of adopting a plurality of screws arranged on the base rather than providing a single thread on the outside surface of this base is explained particularly by the possibility of resisting high mechanical stresses, such as high bending/shear stresses encountered during handling operations.

Nevertheless, with such an assembly, the sealing means must not only prevent water infiltrations, possibly of contaminated-water, between the base of the handling device and the base housing wall provided on the container body, but also prevent water from coming into contact with the attachment screws. Note that the geometry of the outside surfaces of attachment screws, and more specifically threaded surfaces, are such that their decontamination would be difficult because the time necessary to carry out the decontamination operations would be completely unreasonable.

In prior art, a first embodiment of sealing means is known in which silicone or any other similar material is added into the different interstices of the assembly. In this respect, note that silicone is then put into place firstly between the base of the handling device and the base housing wall, and secondly between the attachment screws and the base.

In the long term, this solution proved to be not very efficient in terms of the seal achieved, and a number of disadvantages appeared.

Note firstly that application or repair operations on silicone seals need to be carried out by qualified personnel, due to a fairly complicated operating method. Furthermore, these operations are fairly long to carry out, which contributes towards increasing doses integrated by operators.

Furthermore, the low observed efficiency of silicone seals in terms of the seal provided means that they have to be replaced regularly, consequently leading to the formation of large amounts of chemical/nuclear waste. Furthermore, note that these silicone seals also need to be replaced due to the fact that this material tends to fix contamination.

Furthermore, sealing tests have to be carried out frequently, also due to the low efficiency achieved by silicone seals, which directly results in significant losses during operation. In this respect, note that tests are carried out by making <<pittings>> on seals, which can eventually cause degradation of the silicone and consequently necessitate a repair or replacement of the tested seals.

In order to limit the quantity of silicone to be applied in the interstices, it has been proposed to replace the silicone seals initially provided at the attachment screws, by caps that cover each of these attachment screws individually. However, disassembly operations for such caps are long and tedious, which naturally does not help with concerns about doses integrated by operators. Furthermore, the caps used do not solve the problem related to the seal between the base of the handling device and the base housing wall, such that it is still necessary to use the silicone closing technique using sufficiently large quantities to be restrictive, introducing the many disadvantages described above.

Finally, prior art also includes another type of sealing means that does not use silicone. This consists of a ring or two half-rings made of stainless steel assembled by welding onto the base of the handling device and onto the container body of the container.

Thus, the resulting seal is very satisfactory such that there is no longer any need to make a sealing test. However, if it is required to replace an handling device, for example because it was degraded due to the repetition of handling operations, it is then necessary to grind the welds to remove the two half-rings and so that attachment screws can be accessed. Note that this necessity is also encountered when it is required to check the tightening torque of the attachment screws during maintenance operations.

Thus, although it corrects some disadvantages related to the silicone closing technique, such as the poor seal obtained, this solution is relatively restrictive. The operation to disassemble the handling devices becomes long and difficult due to the need to grind the weld back strips holding the two half-rings together before the attachment screws of these handling devices can be accessed.

OBJECT OF THE INVENTION

Therefore, the purpose of the invention is to propose a container intended for the transport/storage of radioactive materials, the container comprising a container body and at least one handling device assembled on the container body using a plurality of attachment screws, the container at least partially correcting the disadvantages mentioned above related to embodiments according to prior art.

More precisely, the object of the invention is to present a container with sealing means for each handling device designed so as to procure a sufficiently good seal such that when the container is loaded/unloaded in the pool, the contaminated water does not reach the interface between the handling device and the container body, nor the attachment screws for this handling device, the sealing means also being designed so that they can be assembled/disassembled more quickly and more easily than in embodiments according to prior art.

To achieve this, the purpose of the invention is a container intended for transport/storage of radioactive materials, the container comprising a container body and at least one handling device assembled on the container body, each handling device being provided with a main part capable of cooperating with a gripping mechanism and projecting from the container body, and a base fixed to the main part and located in a base housing delimited by a base housing wall formed on the container body. The container also comprises firstly a plurality of attachment screws for each handling device distributed around the main part and attaching the base onto the container body, and secondly sealing means inserted between the base of the handling device and the container body of the container. According to the invention, the sealing means for each handling device comprise a sealing plate located in a plate housing delimited jointly by a plate housing wall provided on the base of the handling device and by a portion of the base housing wall, this sealing plate being installed removably in the plate housing so as to surround the main part of the handling device and to cover each attachment screw, the sealing means also including an external seal inserted between a peripheral wall external to the sealing plate and the portion of the base housing wall partially delimiting the plate housing, and an internal seal inserted between a peripheral wall internal to the same sealing plate and the plate housing wall.

Advantageously, the sealing means used in the container according to the invention satisfactorily protect all sensitive areas present in the assemblies between a handling device and the container body of the container.

These sealing means with a relatively simple design have an external seal preventing water infiltrations between the base of the handling device and the base housing wall provided on the container body, so as to prevent contamination of the interface between the handling device and the containers body. Furthermore, the sealing means comprise an internal seal that cooperates with a sealing plate and the external seal to prevent water from entering a space partially delimited by the sealing plate, inside which attachment screws of the handling device are located. Thus, the attachment screws are also protected from possible contamination.

Furthermore, the sealing plate is advantageously installed removably, for example screwed or clipped into its associated plate housing, which provides speed and ease of assembly/disassembly of this sealing plate.

In this way, assembly and disassembly operations of such a plate do not require any special training of operators, unlike sealing means previously used in some embodiments according to the state of the art.

Furthermore, the reduction in the assembly/disassembly time of the sealing means results directly in a drop of doses integrated by operators during handling operations, and by significant savings in operation. Note also that the good seal obtained by the container sealing means according to the invention contributes firstly to provide an efficient barrier against contamination, but also to achieve further savings in operation due to the significant reduction to the number of repairs to be made, particularly compared with less reliable solutions using silicone seals. In this respect, note that the lack of silicone or similar materials eliminates the need for operators to worry about the harmful effects caused by the toxicity of such products, and also reduces the quantity of chemical/nuclear waste produced.

Preferably, the external peripheral wall of the sealing plate comprises an external edge in contact with the external seal, and the internal peripheral wall of the sealing plate comprises an internal edge in contact with the internal seal. It is then possible for the external edge to have an external groove extending along the external edge inside which the external seal is located, and for the internal edge to have an internal groove extending along the internal edge and inside which the internal seal is located. Thus, the sealing means not yet assembled on the container advantageously form a single and compact block. Obviously, it would also be possible to place external and internal seals in grooves formed in the base housing wall and in the plate housing wall respectively, without going outside the scope of the invention.

Preferably, each handling device is provided with a channels network for making a sealing test of the sealing means, the channels network communicating at least with an access orifice provided in the main part of the handling device so as to open up on the outside of this main part, each access orifice being closed off using a removable plug. Thus, sealing test operations can be done easily and quickly by removing the plug on an access orifice, then by connecting conventional test means to this access orifice. Consequently, the channels network provided on the handling device enables a reliable test to be carried out without damaging the tested sealing means.

In this context, note that for each handling device, the sealing plate has an inside surface partially delimiting a space surrounding the main part of the handling device and partly filled in by the heads of the attachment screws. In this way, the channels network mentioned above may be arranged so as to enable communication between this space and at least one access orifice, so that a sealing test can be carried out.

Furthermore, the base of each handling device is provided with a plurality of attachment screw passage holes. Thus, also in order to make a sealing test, the channels network can be arranged so as to enable communication between each passage hole and at least one access orifice.

Naturally, the channels network formed in the handling device, can be made so that it is capable of fulfilling one or the other of the functions mentioned above, or both simultaneously.

According to a first preferred embodiment of this invention, the sealing plate for each handling device is in the shape of a ring and the external and internal seals are each in the shape of an annular seal.

Thus, the specific ring shape of the sealing plate is such that it can be installed screwed in the plate housing.

To achieve this, it will be possible to have a threaded portion on the internal edge of the sealing plate and on the plate housing wall provided on the base of the handling device, cooperating with each other. Furthermore, the sealing plate then advantageously comprises an external surface on which there are gripping orifices capable of cooperating with an appropriate tool for fast assembly/disassembly by screwing/unscrewing the sealing plate.

Note also that this first preferred embodiment is particularly but not exclusively adapted when the attachment screws are arranged so as to define a circle, and when the base of the handling device is cylindrically shaped with a circular section.

According to a second preferred embodiment of this invention, the sealing plate for each handling device is installed clipped in the plate housing.

To achieve this, the plate housing wall provided on the base of the handling device preferably comprises a shoulder, the internal seal housed in the groove of the internal edge of the sealing plate bearing in contact with an inside surface of this shoulder, in order to maintain the sealing plate in the plate housing. In this configuration, the internal seal can also be compressed between the groove of the internal edge and a part of the maximum diameter of the shoulder, to enable assembly/disassembly of the sealing plate.

Furthermore, in order to facilitate assembly/disassembly by clipping of the sealing plate, it will be possible for at least one access orifice provided in the main part of the handling device to be capable of holding pressurisation/vacuum creation means that can generate a pressure/vacuum inside the space partially delimited by the inside surface of the sealing plate and surrounding the main part of the handling device, through the channels network. Advantageously, the use of such an assembly/disassembly method no longer requires the presence of gripping orifices on the outside surface of the sealing plate. Obviously, this absence is an advantage, to the extent that decontamination of such orifices can be tedious. Furthermore, the lack of gripping orifices on the outside surface of the sealing plate advantageously contributes to giving a very good visual aspect to the container.

Furthermore, assembly by clipping of the sealing plate can enable the sealing plate to be indifferently in the shape of a ring or a frame, unlike the screwing solution presented in the first preferred embodiment of this invention. Thus, when the sealing plate is in the shape of an arbitrary frame surrounding the main part of the handling device, the external and internal seals are also in the shape of a frame.

Note that this frame shape is particularly but once again not exclusively suitable when the attachment screws that will be covered by the sealing plate are arranged so as to define a frame and not a circle, this specific arrangement particularly being used when the base of the handling device is in the shape of a rectangle parallelepiped.

Other advantages and characteristics of the invention will become clear after reading the detailed non-limitative description given below.

BRIEF DESCRIPTION OF THE DRAWINGS

This description will be made with reference to the attached drawings among which.

DETAILED PRESENTATION OF PREFERRED EMBODIMENTS

The container according to the invention is similar to the container 1 presented in FIG. 1 and already partially described above.

Thus, the container 1 according to the invention comprises a plurality of handling devices 8 assembled on the container body 2.

Note that the container body 2 has an external wall 7, preferably cylindrically shaped with a longitudinal axis 22. In the remainder of this description, this axis 22 will therefore be considered as being the longitudinal axis of the container body 2.

The handling devices 8 are distributed circumferentially about the container body 2, for example at an upper end portion 2a and at a lower end portion 2b of the container body 2.

Figure 2:
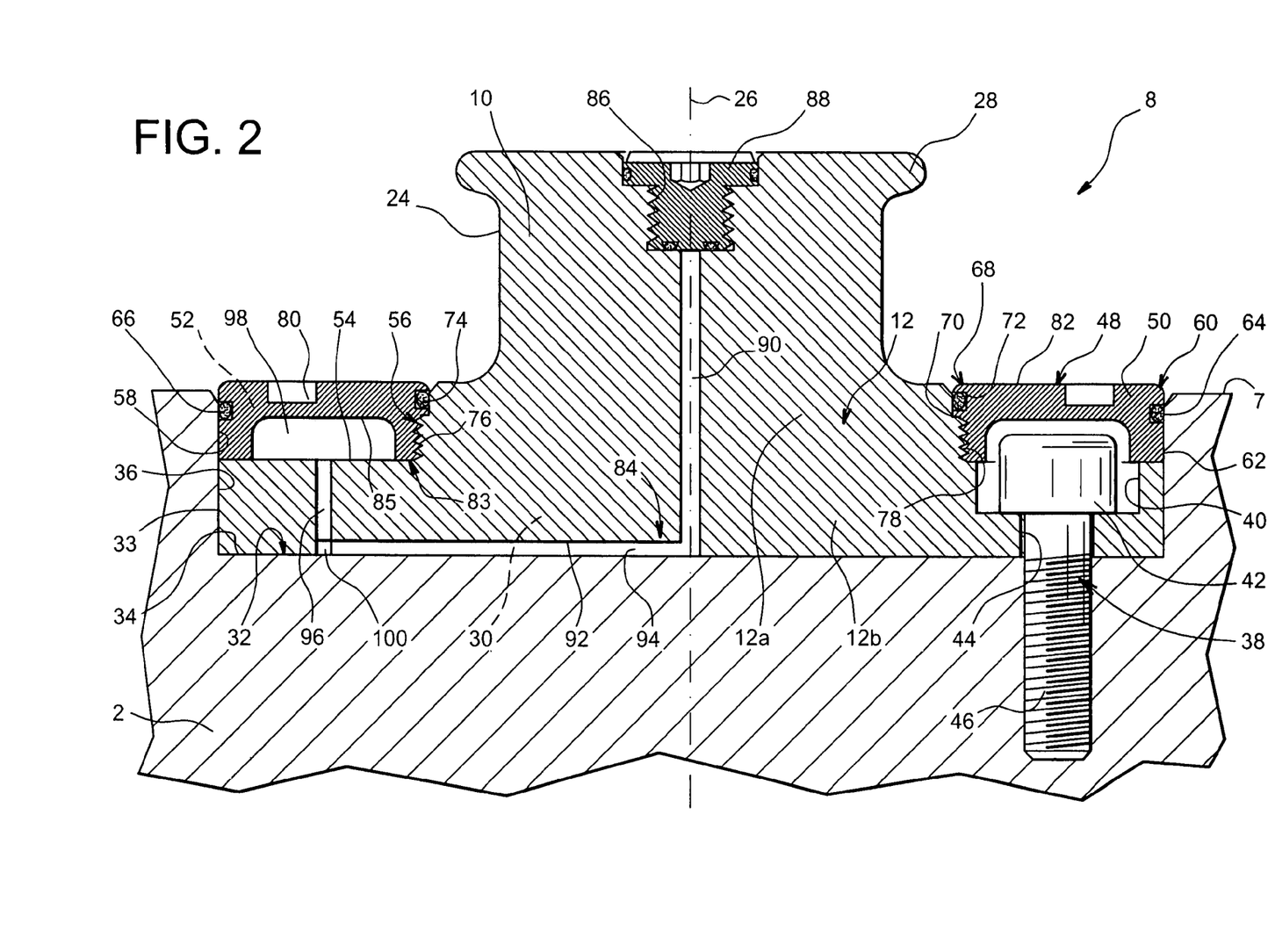
FIG. 2 shows a sectional view of an assembly between a container body and a handling device of a container according to a first preferred embodiment of this invention, this view being taken along line II—II in FIG. 3.
Figure 3:
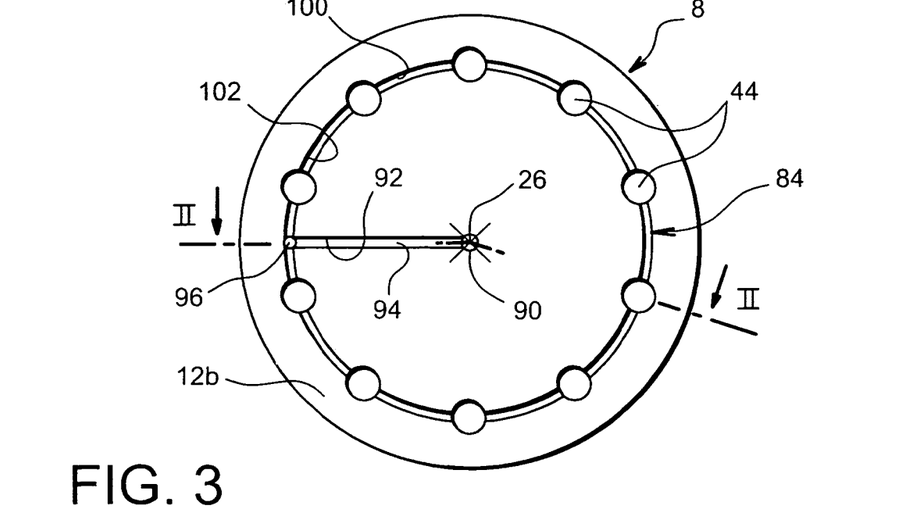
FIG. 3 shows a bottom view of the handling device shown on the assembly in FIG. 2.

With reference jointly to FIGS. 2 and 3, the figures show an assembly between the container body 2 and one of the handling devices 8 of a container 1 according to a first preferred embodiment of this invention. Obviously, in this preferred embodiment, all assemblies between the handling devices 8 and the container body 2 are preferably identical to the embodiment that will be described below.

The handling device 8 has a main part 10 and a base 12, these two parts 10 and 12 being fixed and preferably made in a single piece of stainless steel.

The main part 10 projects outwards from the container body 2, and its geometry is adapted so that it can easily cooperate with a gripping mechanism (not shown), in order to enable execution of handling operations. As an illustrative example, the main part 10 of the handling device 8 has a cylindrically shaped outside surface 24 with a circular section, with a longitudinal axis 26 approximately perpendicular to the longitudinal axis 22 of the container body 2. Furthermore, the main part 10 may comprise an end portion 28 in the shape of a shoulder, to prevent the gripping mechanism from escaping during handling operations.

Furthermore, the base 12 of the handling device 8 is located in a base housing 30 delimited by a base housing wall 32, this wall being provided on the container body 2 of the container 1. Furthermore, the base 12 comprises an upper portion 12a and a lower portion 12b, the lower portion 12b preferably having a cylindrically shaped lateral surface 33 with a circular section and a longitudinal axis coincident with the longitudinal axis 26 of the outside surface 24 of the main part 10.

The base housing wall 32 comprises a flat bottom 34 acting as a stop for the lower portion 12b of the base 12, and a cylindrically shaped lateral part 36 with a circular section and matching the entire lateral surface 33 of the same lower portion 12b. However, as can be seen in FIG. 2, note that the lower portion 12b of the base 12 only partially occupies the base housing 30, such that the lateral surface 33 of the lower portion 12b only matches a portion of the lateral part 36.

Naturally, the lateral part 36 of the base housing wall 32 and the lateral surface 33 of the lower portion 12b of the base 12 could be in any other shape, provided that they are approximately complementary without going outside the scope of the invention.

The base 12 of the handling device 8 is assembled in the base housing 30 using a plurality of attachment screws 38 distributed around the main part 10, and that can be screwed in the container body 2 of the container 1. To achieve this, the lower portion 12b of the base 12 is provided with screw head housings 40 preferably distributed concentrically around the longitudinal axis 26, each of these screw head housings 40 being capable of forming a stop for the head 42 of an attachment screw 38. Furthermore, each screw head housing 40 is prolonged by a passage hole 44, through which the threaded portion 46 of the attachment screw 38 passes.

The assembly between the handling device 8 and the container body 2 also requires sealing means 48 arranged so as to provide a sufficiently satisfactory seal so that when the container 1 is loaded/unloaded in the pool, the contaminated water does not reach the interface between the handling device 8 and the container body 2, nor the attachment screws 38 of the same handling device 8.

The sealing means 48 then comprise a sealing plate 50 in the shape of a ring preferably made of stainless steel, and located in a plate housing 52 so as to cover each of the attachment screws 38.

As can be seen in FIG. 2, the plate housing 52 is delimited by a flat bottom 54 formed by the lower portion 12b of the base 12, by a plate housing wall 56 provided on the upper portion 12a of the base 12, and by a portion 58 of the lateral part 36 of the base housing wall 32. In this respect, note that the portion 58 of the lateral part 36 corresponds to the upper portion that is not in contact with the lateral surface 33 of the lower portion 12b of the base 12.

Furthermore, note that the plate housing wall 56 is approximately cylindrically shaped with a longitudinal axis coincident with the longitudinal axis 26.

The sealing plate 50 comprises an external peripheral wall 60, particularly with an external edge 62 corresponding to the external edge of the plate matching the portion 58 of the lateral part 36 of the base housing wall 32. The external edge 62 also has an external groove 64 inside which an annular external seal 66 is housed, this seal 66 also being in contact with the portion 58 of the lateral part 36 so as to prevent contamination from entering between the handling device 8 and the container body 2.

Similarly, the sealing plate 50 comprises an internal peripheral wall 68 particularly with an internal edge 70 which corresponds to the internal edge of the plate matching the plate housing wall 56 provided on the upper portion 12a of the base 12. Furthermore, the internal edge 70 has an internal groove 72 inside which an internal annular seal 74 is housed, this seal 74 also being in contact with the plate housing wall 56. The combination of seals 66 and 74 prevents contamination from reaching the attachment screws 38. Note that the external and internal seals 66 and 74 are preferably made from an elastomer material.

In order to make the sealing plate 50 perfectly removable, the internal edge 70 of the sealing plate is provided with a threaded portion 76 with a longitudinal axis coincident with the longitudinal axis 26, and capable of cooperating with a threaded portion 78 provided on the plate housing wall 56. In this way, the sealing plate 50 can be mounted screwed on the base 12. Note that the threaded portion 76 of the internal edge 70 is located along the prolongation of the portion of the same edge on which the groove 72 is formed, which is further outwards on the container body 2 than the threaded portion 76.

Note as can be seen in FIG. 2 that the sealing plate 50 may comprise gripping orifices 80 formed on its outside surface 82 that will cooperate with an adapted tool (not shown), to facilitate screwing/unscrewing operations of this sealing plate. Note also that when the sealing plate 50 is assembled onto the base 12 of the handling device 8 by screwing, the inside surface 83 of this plate 50 stops in contact with the lower portion 12b of the base 12, and more precisely against the flat bottom 54 delimiting the plate housing 52. In this respect, note also that the inside surface 83 of the sealing plate 50 must be adapted to come into contact with the flat bottom 54 and not with the attachment screws 38, the heads 42 of these attachment screws 38 being capable of projecting outside the screw head housings 40. Consequently, the inside surface 83 preferably has an annular recess 85 facing the attachment screws 38 and designed such that the screw heads 42 can be partially inserted into this indentation 85 without forming stops, when the sealing plate 50 is assembled on the base 12 by screwing.

Note also that when the sealing plate 50 is completely assembled, the outside surface 82 of this plate 50 is approximately continuous with the external wall 7 of the container body 2.

Also with reference to FIGS. 2 and 3, the handling device 8 is provided with a channels network 84 for making a sealing test of the sealing means 48. The channels network 84 is made so as to communicate with an access orifice 86 provided at the end of the main part 10 of the handling device 8, this access orifice 86 opening outside this main part 10 and being closed off using a removable plug 88, preferably mounted screwed on the access orifice 86.

The channels network 84 comprises firstly a longitudinal, channel 90 opening up in the access orifice 86 and having an axis coincident with the longitudinal axis 26 of the outside surface 24 of the main part 10, the channel 90 being formed so that it passes entirely through the handling device 8. A radial groove 92 is also provided on the lower portion 12b of the base 12, this groove 92 forming a radial channel 94 with the flat bottom 34 of the base housing wall 32, communicating with the channel 90 and being perpendicular to the longitudinal axis 26.

Another longitudinal channel 96 starts from this radial channel 94 and extends approximately parallel to channel 90 in the direction of a space 98 surrounding the main part 10 of the handling device 8 and partially delimited by the recess 85 of the inside surface 83 of the sealing plate 50. Note that this space 98 is also partially delimited by the flat bottom 54 of the plate housing 52, and is partly filled in by the heads 42 of the attachment screws 38.

Also starting from the radial channel 94, a circumferential channel 100 with an axis coincident with the longitudinal axis 26 extends so as to pass through all passage holes 44. In this respect, note that the circumferential channel 100 is made jointly using a circumferential groove 102 provided on the lower portion 12b of the base 12, and the flat bottom 34 of the base housing wall 32.

Obviously, the channels network 84 may be adapted, always so as to enable communication between the space 98 and the access orifice 86 and/or so as to enable communication between each of the passage holes 44 and the access orifice 86, without going outside the scope of the invention.

Figure 4:
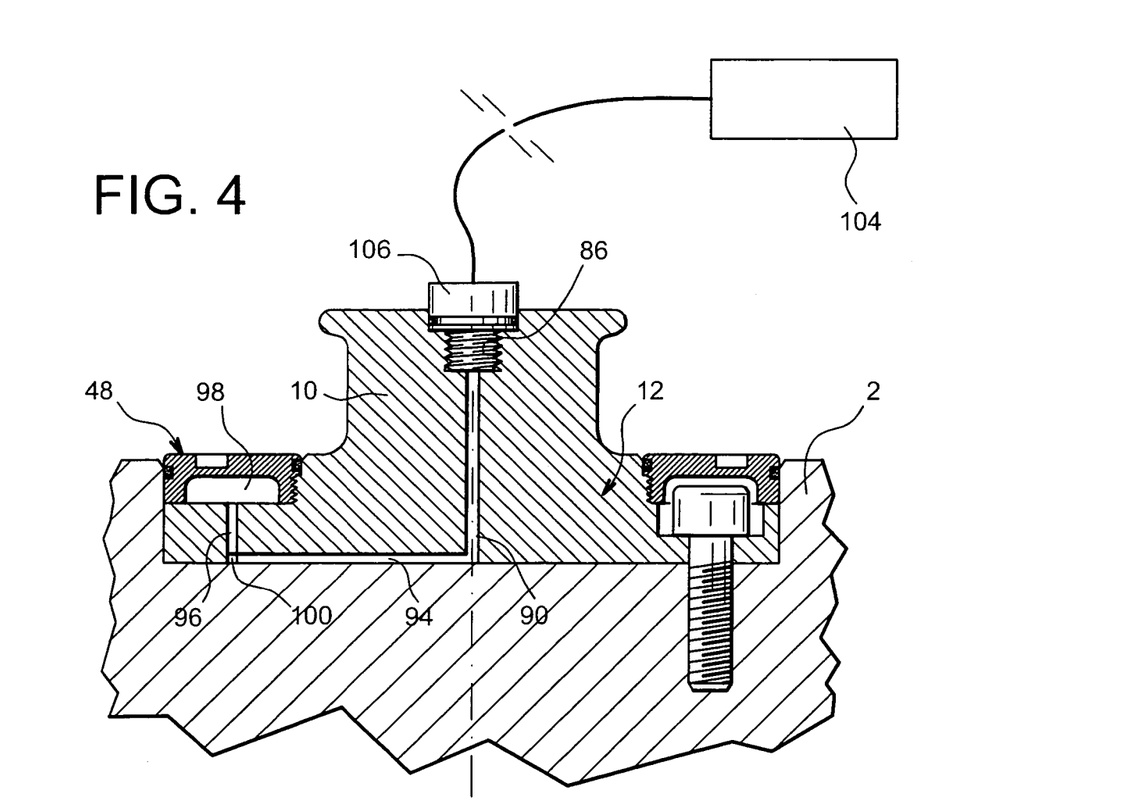
FIG. 4 shows a view similar to that shown in FIG. 2, when the main part of the handling device cooperates with sealing test means.

With reference to FIG. 4, the removable plug 88 is removed so that the conventional sealing test means 104 can communicate with the channels network 84, and so as to make a sealing test of the sealing means 48. Thus, this communication can be made quickly by screwing a perforated end piece 106 belonging to the control means 104, into the access orifice 86 of the main part 10.

Figure 5:
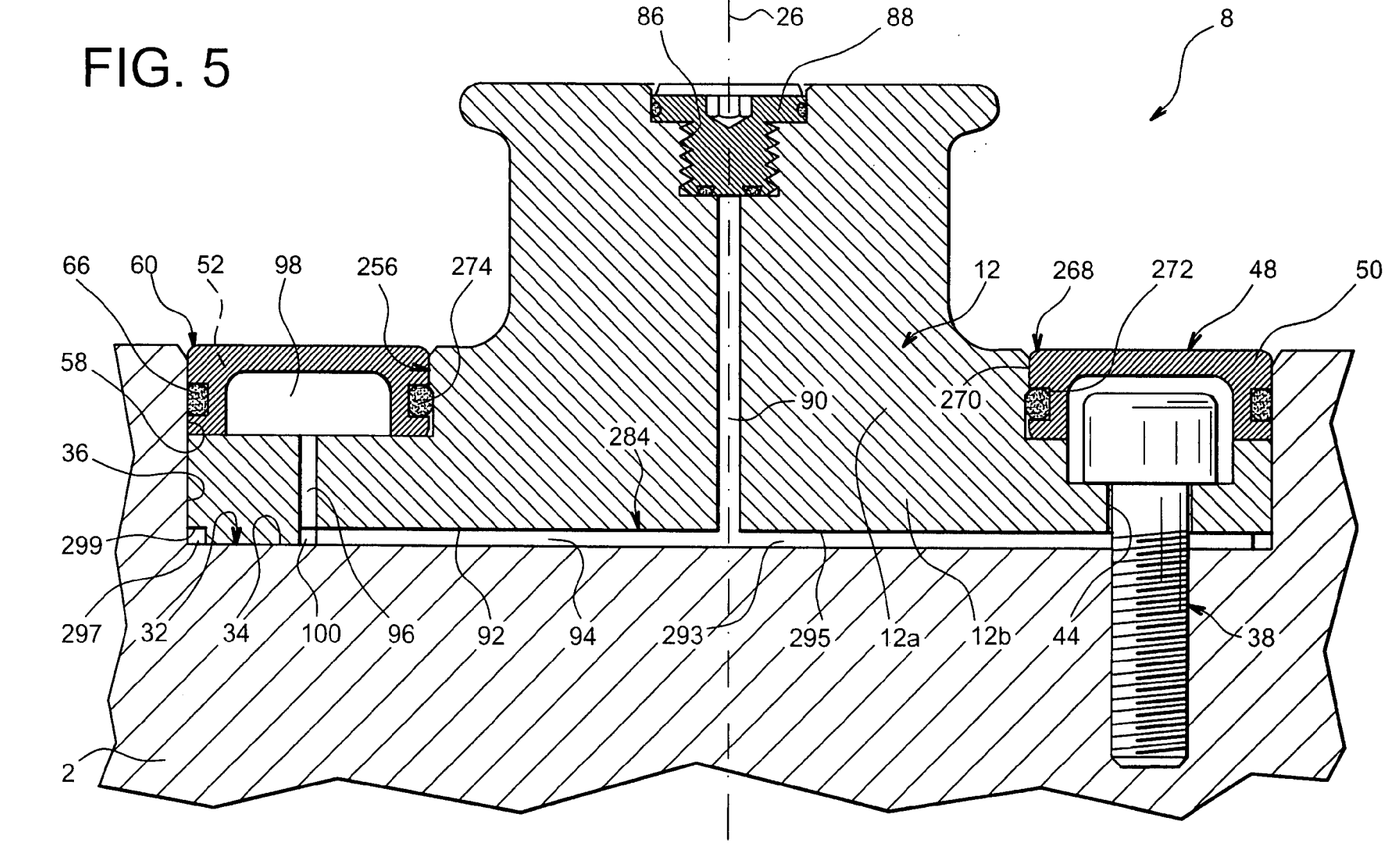
FIG. 5 shows a sectional view of an assembly between a container body and a handling device of a container according to a second preferred embodiment of this invention, this view being taken along line V—V in FIG. 7.
Figure 6:
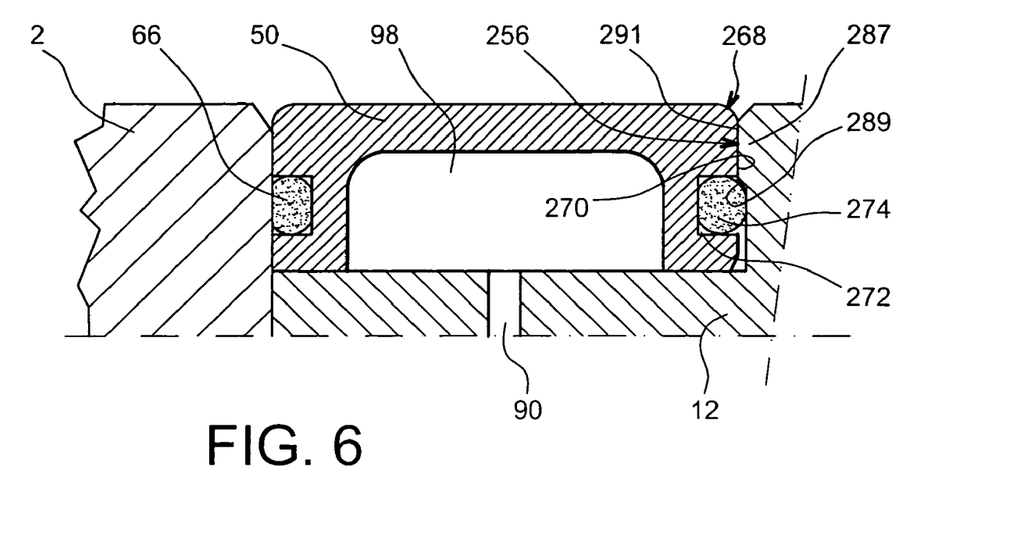
FIG. 6 shows a larger scale view of a part of the assembly shown in FIG. 5, diagrammatically showing the means used to maintain the sealing plate in its associated plate housing more clearly.
Figure 7:
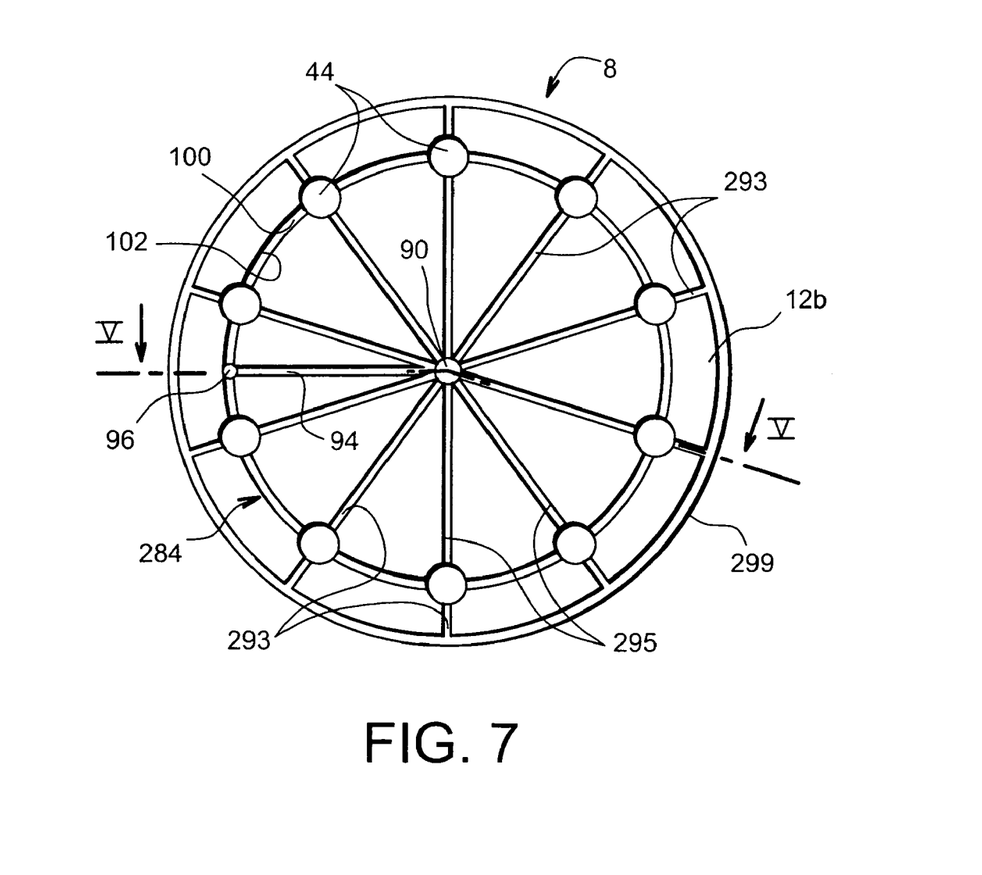
FIG. 7 shows a bottom view of the handling device shown on the assembly in FIG. 5.

With reference jointly to FIGS. 5 to 7, the figures show an assembly between the container body 2 and one of the handling devices 8 of a container 1 according to a second preferred embodiment of this invention. Obviously, in this preferred embodiment, all assemblies between the handling devices 8 and the container body 2 are preferably identical to what is described below.

In these FIGS. 5 to 7, elements marked with the same numeric references as those attached to the elements shown in FIGS. 1 to 4, correspond to identical or similar elements.

In this respect, note that this assembly is fairly similar to that shown in the first preferred embodiment of this invention, except that the sealing plate 50 of the sealing means 48 is no longer installed into the plate housing 52 by screwing, but is clipped into it.

To achieve this, the sealing plate 50 comprises an internal peripheral wall 268 in particular provided with an internal edge 270, this edge corresponding to the internal edge of the plate matching a plate housing wall 256 provided on the upper portion 12a of the base 12. Note that the shape of the plate housing wall 256 is not the same as the shape of the plate housing wall 56 in the first preferred embodiment, but it is still approximately cylindrical with a longitudinal axis coincident with the longitudinal axis 26. In this respect, note that the only difference between the sealing plates of the first and second preferred embodiments is at the internal edges 70 and 270.

Similarly, note that the elements delimiting the plate housing 52 other than the plate housing wall 256, in other words the flat bottom 54 formed by the lower portion 12b of the base 12 and the portion 58 of the lateral part 36 of the base housing wall 32, are identical to those presented in the first preferred embodiment of this invention.

Thus, the internal edge 270 is provided with an internal groove 272 inside which an annular internal seal 274 is housed, this seal 274 also being in contact with the plate housing wall 256 to prevent contamination from reaching the attachment screws 38. Note that the internal seal 274 is preferably made from an elastomer material.

As can be seen in FIG. 6, the plate housing wall 256 comprises a shoulder 287 extending towards the inside of the plate housing 52. When the sealing plate 50 is installed on the base 12 of the handling device 8, the internal seal 274 housed in the groove 272 and projecting outside it bears in contact with an inside surface 289 of the shoulder 287, generally oriented towards the lower portion 12b of the base 12. Consequently, this particular configuration assures that the sealing plate 50 is held in place in the plate housing 52. As an illustrative example, the inside surface 289 of the shoulder 287 may be approximately perpendicular to the longitudinal axis 26, or it may be inclined so as to move away from this axis 26 as the distance from the lower portion 12b increases.

Furthermore, the internal seal 274 is designed so that it is compressed between the groove 272 of the internal edge 270, and a part 291 of the shoulder 287 with maximum diameter, so that the sealing plate 50 can be assembled by clipping. Consequently, once the maximum diameter part 291 has been passed, the internal seal 274 can partially decompress, in particular so as to match the inside surface 289 of the shoulder 287.

With reference particularly to FIGS. 5 and 7, the handling device 8 is provided with a channels network 284 to make a sealing test of the sealing means 48, this channels network 284 being different from the channels network 84 described in the first preferred embodiment. However, the channels network 284 may also be adapted, once again so as to enable communication between the space 98 and the access orifice 86, and/or to enable communication between each of the passage holes 44 and the access orifice 86, without going outside the scope of the invention.

The channels network 284 firstly comprises the longitudinal channel 90 opening into the access orifice 86, the radial channel 94 formed jointly by the groove 92 and the flat bottom 34 of the base housing wall 32, the longitudinal channel 96 extending approximately parallel to the channel 90 towards the space 98 surrounding the main part 10, and the circumferential channel 100 formed jointly by the circumferential groove 102 and the flat bottom 34 of the base housing wall 32.

Furthermore, the channels network 284 also comprises a plurality of radial channels 293 communicating with the channel 90, the radial channels 293 being formed partly using radial grooves 295 formed on the lower portion 12b of the base 12, and secondly using the flat bottom 34 of the base housing wall 32.

Each of the radial channels 293 passes through a passage hole 44 and extends as far as the lateral surface 33 of the lower portion 12b of the base 12. Moreover, there is another circumferential channel 297 that communicates with each of the radial channels 293, the circumferential channel 297 being formed jointly by circumferential machining 299 formed on the lower portion 12b of the base 12, the flat bottom 34 of the base housing wall 32 and the lateral part 36 of the base housing wall 32.

With the channels network 284 described above, it is possible not only to make sealing tests by connecting sealing test means 104 to the access orifice 86, but also to facilitate/perform assembly/disassembly operations of the sealing plate 50.

The access orifice 86 is also capable of receiving pressurisation/vacuum creation means (not shown) that can generate a pressure/vacuum through the channels network 284, inside the space 98. Note that these pressurization/vacuum creation means are extremely useful particularly during the operation to compress the internal seal 274 between the shoulder 287 and the groove 272, which is difficult to do with a simple manual operation. Furthermore, this plate 50 can then be disassembled by a single pressurization of the space 98 without the need for any additional special tools or gripping orifices on the outside surface 82 of the sealing plate 50.

Finally, note that with the clipping solution for assembly of the sealing plate 50, there is no longer any need to limit the shape of this sealing plate to a ring. Assembly by clipping does not require any particular shape, unlike assembly by screwing that requires a cylindrically shaped section. In this way, the sealing plate 50 can then be in the shape of any frame, provided with external and internal seals also in the shape of a frame, this possibility resulting directly in a wide choice of positions of the attachment screws 38 on the base 12, and a wide choice in the geometry of this base.

Obviously, those skilled in the art could make many modifications to the container 1 that has been described, simply as non-limitative examples.

The invention claimed is:

1. Container intended for transport/storage of radioactive materials, comprising a container body and at least one handling device assembled on said container body, each handling device being provided with a main part capable of cooperating with a gripping mechanism and projecting from the container body, and a base fixed to the main part and located in a base housing delimited by a base housing wall formed on the container body, the container also comprising firstly a plurality of attachment screws for each handling device distributed around the main part and attaching the base onto the container body, and secondly sealing means inserted between the base of the handling device and the container body, characterised in that the sealing means for each handling device comprise a sealing plate located in a plate housing delimited jointly by a plate housing wall provided on the base of the handling device and by a portion of the base housing wall, said sealing plate being installed removably in the plate housing so as to surround the main part of said handling device and to cover each attachment screw, said sealing means also including an external seal inserted between a peripheral wall external to said sealing plate and the portion of the base housing wall partially delimiting the plate housing, and an internal seal inserted between a peripheral wall internal to said sealing plate and the plate housing wall.

2. Container according to claim 1, characterised in that the external peripheral wall of the sealing plate comprises an external edge in contact with the external seal, and in that the internal peripheral wall of the sealing plate comprises an internal edge in contact with the internal seal.

3. Container according to claim 2, characterised in that the external edge has an external groove extending all along said external edge and inside which the external seal is located, and in that the internal edge has an internal groove extending all along said internal edge and inside which the internal seal is located.

4. Container according to claim 3, characterised in that for each handling device, the plate housing wall provided on the base of the handling device comprises a shoulder, the internal seal housed in the groove of the internal edge of the sealing plate bearing in contact with an inside surface of said shoulder in order to maintain said sealing plate in the plate housing, the internal seal being compressed between the groove of the internal edge and a part of the maximum diameter of the shoulder, to enable assembly/disassembly of said sealing plate.

5. Container according to claim 4, characterised in that at least one access orifice provided in the main part of the handling device is capable of holding pressurisation/vacuum creation means that can generate a pressure/vacuum inside a space partially delimited by the inside surface of the sealing plate and surrounding the main part of the handling device, through a channels network in order to cause assembly/disassembly of the sealing plate.

6. Container according to claim 2, characterised in that the internal edge of the sealing plate and the plate housing wall provided on the base of the handling device, each have a threaded portion cooperating with each other.

7. Container according to claim 1, characterised in that each handling device is provided with a channels network for making a sealing test of the sealing means, the channels network communicating at least with an access orifice provided in the main part of the handling device so as to open up on the outside of said main part, each access orifice being closed off using a removable plug.

8. Container according to claim 7, characterised in that for each handling device, the sealing plate has an inside surface partially delimiting a space surrounding the main part of the handling device and partly filled in by the heads of the attachment screws, the channels network being arranged so as to enable communication between said space and at least one access orifice.

9. Container according to claim 8, characterised in that at least one access orifice provided in the main part of the handling device is capable of holding pressurisation/vacuum creation means that can generate a pressure/vacuum inside the space partially delimited by the inside surface of the sealing plate and surrounding the main part of the handling device, through the channels network in order to cause assembly/disassembly of the sealing plate.

10. Container according to claim 1, characterised in that the sealing plate for each handling device is in the shape of a ring and in that the external and internal seals are each in the shape of an annular seal.

11. Container according to claim 10, characterised in that the sealing plate for each handling device is installed screwed in the plate housing.

12. Container according to claim 11, characterised in that an internal edge-of the sealing plate and the plate housing wall provided on the base of the handling device, each have a threaded portion cooperating with each other.

13. Container according to claim 1, characterised in that the sealing plate for each handling device, is in the shape of a frame, and in that each of the external and internal seals is also in the shape of a frame.

14. Container according to claim 1, characterised in that the sealing plate for each handling device is installed clipped in the plate housing.

15. Container according to claim 14, characterised in that for each handling device, the plate housing wall provided on the base of the handling device comprises a shoulder, the internal seal housed in a groove of an internal edge of the sealing plate bearing in contact with an inside surface of said shoulder in order to maintain said sealing plate in the plate housing, the internal seal being compressed between the groove of the internal edge and a part of the maximum diameter of the shoulder, to enable assembly/disassembly of said sealing plate.

16. Container according to claim 1, characterised in that the sealing plate for each handling device is made of stainless steel.

17. Container according to claim 1, characterised in that for each handling device, each of the external and internal seals is made from an elastomer material.

* * * * *